United States Patent [19]

Takaoka et al.

[11] Patent Number: 4,767,589
[45] Date of Patent: Aug. 30, 1988

[54] METHOD FOR JOINTING CV CABLES

[75] Inventors: Michio Takaoka, Chiba; Tsuneaki Motai, Yachiyo; Motoyuki Ono, Sakura; Isao Kaji, Ichikawa; Masakazu Hasegawa, Funabashi; Masayuki Tan, Chiba; Masaru Kurata, Tokyo, all of Japan

[73] Assignee: Fujikura Ltd., Tokyo, Japan

[21] Appl. No.: 36,783

[22] Filed: Apr. 10, 1987

Related U.S. Application Data

[62] Division of Ser. No. 851,777, Apr. 14, 1986, Pat. No. 4,701,117.

[51] Int. Cl.$^4$ .................. B29C 35/02; B29C 33/20
[52] U.S. Cl. .................................. 264/500; 156/49; 264/40.1; 264/271.1; 264/319
[58] Field of Search .............. 156/49, 50, 51, 500; 264/259, 261, 262, 271.1, 272.11, 279, 279.1, 85, 500, 345, 347, 328.2, 328.14, 328.16, 236, 241, 267, 219, 40.3, 319, 40.1, 524; 249/83.95; 425/108

[56] References Cited

U.S. PATENT DOCUMENTS

| 1,627,564 | 5/1927 | Loper | 219/526 |
| 2,259,282 | 10/1941 | Williams et al. | 249/78 |
| 2,712,589 | 7/1955 | Piermatteo | 219/553 |
| 3,354,294 | 11/1967 | Kollar et al. | 219/536 |
| 3,911,251 | 10/1975 | Day | 219/552 |
| 4,204,896 | 5/1980 | Richardson | 249/95 |
| 4,400,614 | 8/1983 | Sopory | 219/553 |
| 4,581,265 | 4/1986 | Follette | 156/49 |
| 4,654,241 | 3/1987 | Vallauri et al. | 156/49 |

FOREIGN PATENT DOCUMENTS 58-126688 7/1983 Japan .
58-223279 12/1983 Japan .

*Primary Examiner*—Willard Hoag
*Attorney, Agent, or Firm*—Frishauf, Holtz, Goodman & Woodward

[57] ABSTRACT

A method for jointing CV cables includes a lock mechanism which closes a split portion of a mold, used for extrusion-molding and opens the split portion by heat when crosslinking is performed.

23 Claims, 4 Drawing Sheets

METHOD FOR JOINTING CV CABLES

This is a division of application Ser. No. 851,777, filed 4-14-86, now U.S. Pat. No. 4,701,117 issued Oct. 20, 1987.

BACKGROUND OF THE INVENTION

The present invention relates to an improvement in an apparatus and method for jointing CV cables, wherein extrusion molding and subsequent operations, from crosslinking to cooling, can be continuously performed by a single mold without replacing it.

Extrusion molding has recently been employed to connect very high voltage CV cables. There are two conventional extrusion molding systems: in one, a single mold is used to perform both extrusion molding and subsequent operations from crosslinking to cooling under pressure; and in the other, separate molds are used to perform extrusion molding and subsequent operations. Since the former system allows the extrusion, heating and crosslinking of an insulating resin, it offers shorter operation time than the latter system. Moreover, since the first system uses only one mold, the extrusion molding can be achieved automatically. However, the mold used in the first system cannot as much expand as the molded insulator does during crosslinking, and invitably deforms the insulating portion of the molded body of the cable. In addition, it is difficult to control pressures during the crosslinking and subsequent cooling processes (Japanese patent disclosure Nos. 58-126688 and 58-223279).

SUMMARY OF THE INVENTION

It is an object of the present invention to provide a CV cable jointing apparatus for achieving an extrusion mold joint for an extrusion and crosslinking sequence, wherein a mold is closed during cable molding but is automatically unlocked during crosslinking, thereby allowing a single mold to perform the molding, crosslinking, and cooling sequence.

In order to achieve the above object of the present invention, there is provided an apparatus for connecting CV cables, comprising: mold means for extrusion-molding an insulating member for covering a joint portion between the cables, the mold means being provided with a split portion to be opened along an axial direction thereof; lock mechanism means, mounted on the split portion of the mold means, for closing the split portion during extrusion molding of the insulating member and opening the split portion during heating and crosslinking of the insulating member; and container means for accommodating the mold means and the lock mechanism means through a high-pressure fluid.

With the above arrangement, in the apparatus and method for jointing CV cables of the present invention, the mold means is closed by the lock mechanism means when the insulating molded portion covering the cable joint portion is extrusion-molded. However, during crosslinking, heat and the thermal expansion of resin act on the lock mechanism means to "unlock" it, so that the mold means can be opened along the split portion. Therefore, deformation of the insulating molded portion can be prevented.

DETAILED DESCRIPTION OF THE PREFERRED EMBODIMENTS

Embodiments of the present invention will be described with reference to the accompanying drawings.

Figure 1:
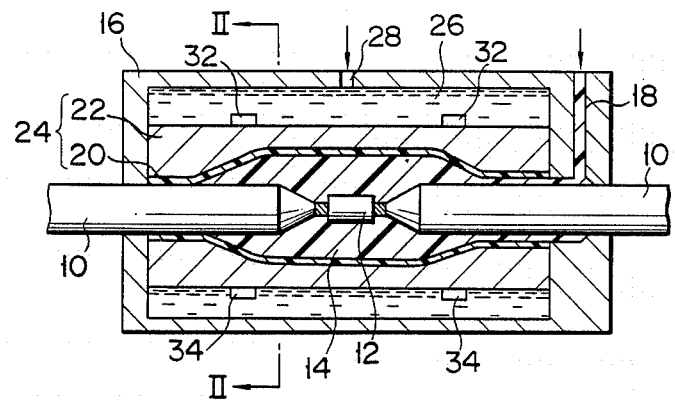
FIG. 1 is a sectional view showing a cable joint portion and the overall structure of a cable joining apparatus according to an embodiment of the present invention.
Figure 2:
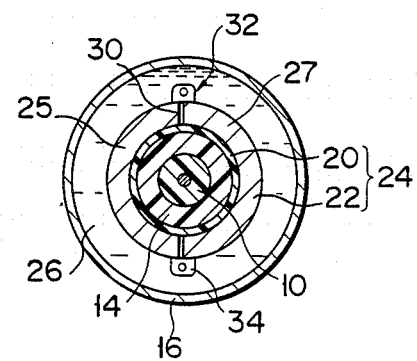
FIG. 2 is a sectional view of the apparatus in FIG. 1 taken along a line II—II thereof.

As shown in FIGS. 1 and 2, cable cores 10 are connected through sleeve 12, and the outer surfaces of cores 10 are reinforced by insulator 14. Insulator 14 is inserted in groove 18 formed in container 16. Insulator 14 is molded by mold 24 defined by elastic tube 20 and a mold 22. Tube 20 is made of a material such as crosslinked polyethylene which can withstand the heat produced during crosslinking. The mold 22 serves to preserve the shape of tube 20, and is made of a material such as iron which can withstand the pressures encountered during molding.

Compressed fluid 26, such as silicone oil or an inert gas, is supplied through supply hole 28 to fill the space between mold 24 and container 16. Two lock mechanisms 32 are arranged on split portion 30 of mold 24 along the longitudinal direction thereof. The corresponding ends of right and left halves 25 and 27 of mold 24 are supported by hinge 34. Halves 25 and 27 can be pivoted to open mold 24 at split portion 30. If mold 24 is made of an elastic metal, the hinge need not be included, since portion 30 can be opened by the elasticity of the metal.

Figure 3:
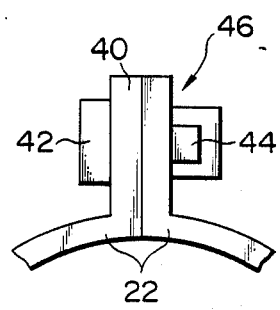
FIG. 3 is a front view showing the main part of a lock mechanism including pins.
Figure 4:
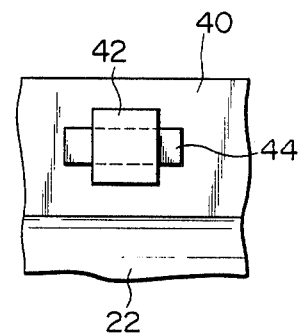
FIG. 4 is a side view of the lock mechanism in FIG. 3.

An embodiment of lock mechanism 32 will now be described. FIGS. 3 and 4 show lock mechanism 46, which includes flanges 40 formed on portion 30 of mold 24 and which uses pin 42 and shear pin 44. At least one of pins 42 and 44 is made of a material whose shape and dimensions satisfy the following conditions. Specifically, at least one of pins 42 and 44 keeps mold 22 closed during extrusion molding, since it can withstand molding heat and pressure. Upon heating, during crosslinking, however, at least one of pins 42 and 44 is melted or is extended or separated by the thermal expansion of resin, thus unlocking mold 22. In order to achieve this, at least one of pins 42 and 44 is made of a resin material (e.g., polyethylene or polypropylene) which melts at the temperatures produced during crosslinking, a resin material (e.g., polycarbonate or nylon) which extends or separates upon the thermal expansion of resin, a ceramic material (e.g., ceramic or porous ceramic), or a metal-based glass material. At least one of pins 42 and 44 may be made of a shape memory alloy which contracts to keep mold 22 in the closed state at extrusion molding temperatures but which extends to open mold 22 at crosslinking temperatures.

Figure 5:
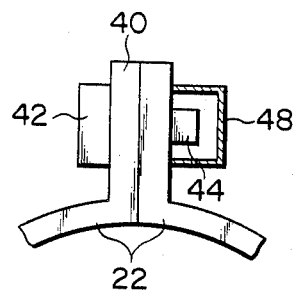
FIG. 5 is a front view of a lock mechanism consisting of pins and a heater.
Figure 6:
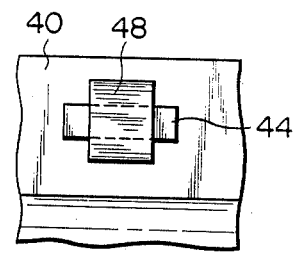
FIG. 6 is a side view of the lock mechanism in FIG. 5.

FIGS. 5 and 6 show a lock mechanism wherein heater 48 is mounted on pins 42 and 44. During crosslinking of the resin, pins 42 and 44 are heated by heater 48.

Figure 7:
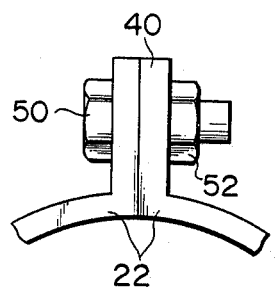
FIG. 7 is a side view of a lock mechanism consisting of a bolt and a nut.
Figure 8:
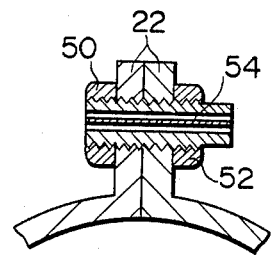
FIG. 8 is a sectional view of a lock mechanism consisting of a bolt with a heater and a nut.
Figure 9:
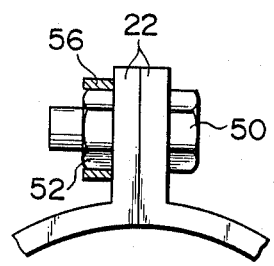
FIG. 9 is a partial sectional side view of a lock mechanism consisting of a nut with a heater and a bolt.

FIGS. 7 to 9 show a lock mechanism wherein at least one of bolt 50 and nut 52 is made of one of the materials described above, and flanges 40 are coupled by bolt 50 and nut 52, thereby closing mold 22.

FIG. 8 shows an arrangement wherein a heater 54 is inserted in the core of bolt 50. FIG. 9 shows an arrangement wherein nut 52 is surrounded by a heater 56.

At least one of bolt 50 and nut 52 is made of tne same material as pins 42 and 44.

Figure 10:
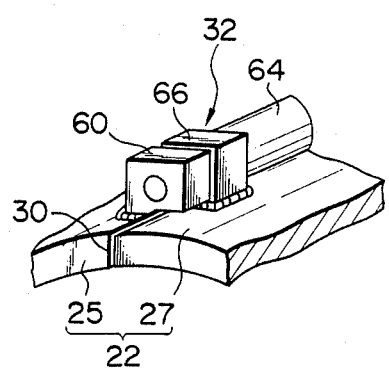
FIG. 10 is a perspective view wherein a lock mechanism consisting of a cylinder means with a piston rod is mounted on the mold.
Figure 11:
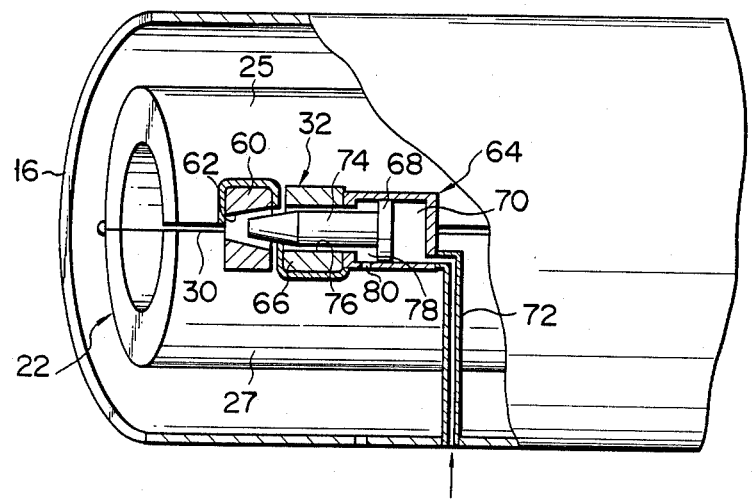
FIG. 11 is an enlarged sectional view of the main part of the lock mechanism in FIG. 10.

As best shown in FIGS. 10 and 11, metal reception member 60 in mechanism 32 is fixed on half 25 of mold 24, and has tapered hole 62. Hydraulic cylinder 64 is fixed on half 27 of mold 24 through metal member 66. Piston 68 is slidably inserted in cylinder 64. Head chamber 70 communicates with a space outside container 16 through pipe 72. Piston rod 74 extends through circular hole 76, and the distal end of rod 74 is inserted in hole 62 of member 60. Rod chamber 78 in cylinder 64 communicates with the space in container 16 through aperture 80.

The operation of the connecting apparatus having the above arrangement will be described below.

When portion 30 of mold 24 is to be closed, high-pressure air is supplied to chamber 70 of cylinder 64 through pipe 72 to insert rod 74 into hole 62 of member 60. In this state, polyethylene is filled in mold 24 through groove 18 to constitute insulator 14.

Figure 12:
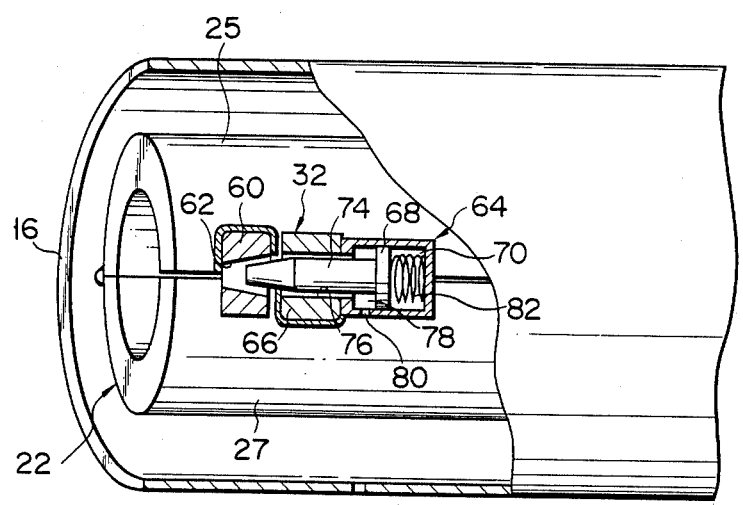
FIG. 12 is a sectional view of another embodiment of the lock mechanism in FIG. 11.

The supply of high-pressure air is then stopped, and compressed air from chamber 70 is exhausted outside container 16 through pipe 72. Subsequently, fluid 26 is supplied to mold 24 through hole 28. At the same time, fluid 26 is heated to be crosslinked. The polyethylene is thus compressed from its outer side and molded. Fluid 26 is also supplied to chamber 78 through aperture 80 formed in cylinder 64. The pressure of fluid 26 acts on rod 74, which is moved backward, thereby releasing the locked state. When polyethylene insulator 14 thermally expands, mold 24 is opened by the expansion force. The molded body is then cooled. In this manner, the thermal expansion of the molded insulator can be absorbed and the insulator is protected from deformation. In the embodiment shown in FIG. 11, high-pressure air is supplied to chamber 70 through pipe 72 to move rod 74 of piston 68 backward. However, as shown in FIG. 12, spring 82 may be arranged in chamber 70 to move rod 74 with its biasing force. The same reference numerals in FIG. 12 denote the same parts as in FIG. 11, and a detailed description thereof will be omitted.

Figure 13:
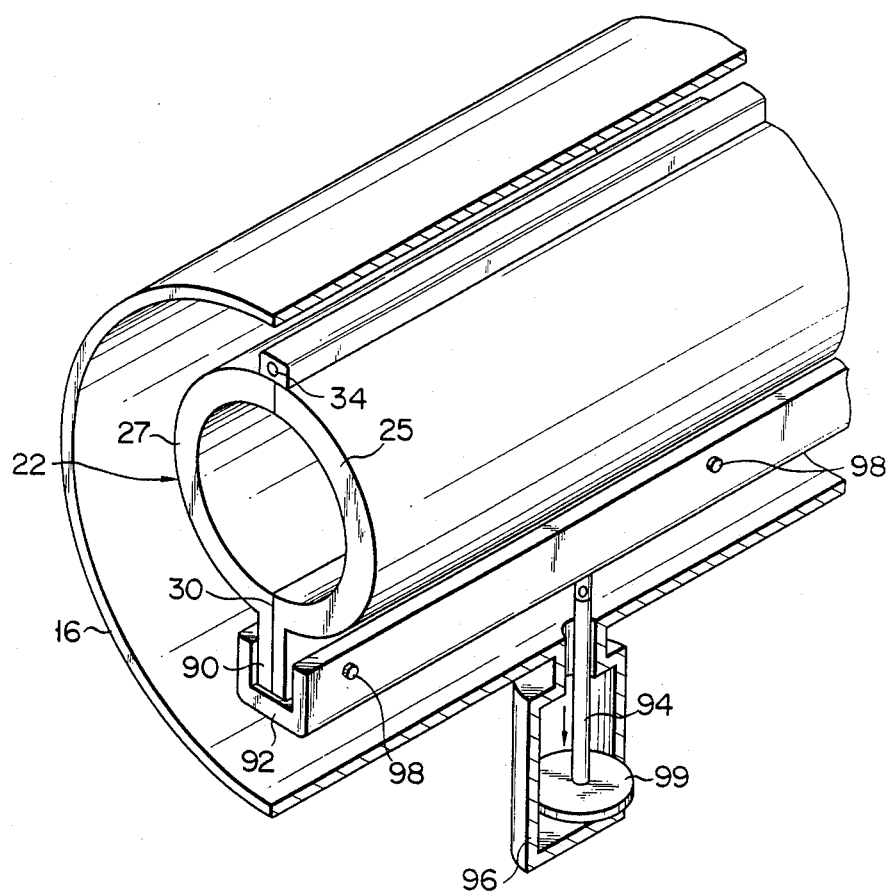
FIG. 13 is an enlarged sectional view of a lock mechanism consisting of a cylinder with a rod and a channel for clamping flanges on a split portion of the molding means.

Another embodiment is illustrated in FIG. 13. Flanges 90 are mounted on split portion 30 of molding cylinder 22. Channel 92 is mounted to clamp flanges 90. Cylinder 96 is arranged in container 16 through rod 94 at the rear side of channel 92. Pin 98 may extend through flanges 90 and channel 92 to fix channel 92.

The operation of this embodiment will be described below. After insulator 14 is extrusion-molded, a high-pressure fluid such as silicone oil is supplied in container 16 to move piston 99 backward during crosslinking. Channel 92 is separated from flanges 90 by rod 94, thereby opening mold 22.

What is claimed is:

1. A method of jointing cables, comprising:
   placing joint portions of CV cables which are to be jointed together into a single mold for molding an insulating member for covering said joint portions of said cables to be jointed together, said mold being provided with a split portion along the axial direction thereof, and said mold being openable at said split portion along said axial direction;
   locking said split portion of said mold in a closed position by means of a lock mechanism on said split portion to lockingly close said mold during molding of said insulating member;
   introducing an insualting material into said mold when said mold is in said locked condition for molding said insulating material around said joint portions to thereby form said insulating member;
   automatically unlocking said lock mechanism to permit opening of said mold along said split portion during heating and crosslinking of said insulating member;
   accommodating said mold and said lock mechanism in a container; and
   introducing a high-pressure fluid into said container, after said insulating material is introduced into said mold, for applying a closing force to said mold when said lock mechanism is automatically unlocked to thereby press against said insulating member during crosslinking of said insulating member.

2. The method of claim 1, comprising crosslinking said insulating material around said joint portions by applying heat to said material in said mold.

3. The mold of claim 2, wherein said lock mechanism is automatically unlocked responsive to said applied heat, to thereby open said mold during said crosslinking of said insulating member.

4. The method of claim 3, wherein said lock mechanism comprises a pin crossing said split portion of said mold, and wherein said step of applying heat includes applying heat to said pin to cause said pin to automatically unlock said lock mechanism responsive to said applied heat.

5. The method of claim 2, wherein said lock mechanism comprises a pin, and wherein said locking step comprises arranging said pin to cross said split portion of said mold for locking said split portion in a closed condition.

6. The method of claim 5, wherein said lock mechanism comprises a lock pin with a heater, said unlocking step comprising operating said heater to apply heat to said lock pin to release said lock pin to unlock said lock mechanism.

7. The method of claim 2, wherein said lock mechanism comprises a lock pin with a heater, said unlocking step comprising operating said heater to apply heat to said lock pin to release said lock pin to unlock said lock mechanism.

8. The method of claim 2, wherein said lock mechanism comprises a bolt crossing said split portion of said mold, and a nut engageable with said bolt and said unlocking step comprises operating on at least one of said bolt and nut to unlock said lock mechanism.

9. The method of claim 8, wherein at least one of said bolt and nut is provided with a heater, and wherein said unlocking step comprises heating said at least one of said bolt and nut for unlocking said lock mechanism.

10. The method of claim 2, wherein said lock mechanism comprises cylinder means mounted on one edge of said mold adjacent said split portion, and having a piston rod; and metal reception means mounted on the other edge of said mold adjacent said split portion, the method further comprising engaging said piston rod with said metal reception when said split portion of said mold means is to be closed, and disengaging said piston rod from said metal reception means when said split portion is to be opened.

11. The method of claim 10, comprising supplying high-pressure air to said piston rod of said cylinder means for moving said piston rod by the supply and exhaustion of said high-pressure air.

12. The method of claim 4, comprising making said pin from a material selected from the group consisting of polycarbonate, nylon, acrylic resin, polypropylene, and polyethylene.

13. The method of claim 5, comprising making said pin from a material selected from the group consisting of polycarbonate, nylon, acrylic resin, polypropylene, and polyethylene.

14. The method of claim 6, comprising making said pin from a material selected from the group consisting of polycarbonate, nylon, acrylic resin, polypropylene, and polyethylene.

15. The method of claim 7, comprising making said pin from a material selected from the group consisting of polycarbonate, nylon, acrylic resin, polypropylene, and polyethylene.

16. The method of claim 4, comprising making said pin from a material selected from the group consisting of a ceramic, a metal, and glass.

17. The method of claim 5, comprising making said pin from a material selected from the group consisting of a ceramic, a metal, and glass.

18. The method of claim 6, comprising making said pin from a material selected from the group consisting of a ceramic, a metal, and glass.

19. The method of claim 7, comprising making said pin from a material selected from the group consisting of a ceramic, a metal, and glass.

20. The metod of claim 4, comprising making said pin from a shape memory alloy.

21. The method of claim 5, comprising making said pin from a shape memory alloy.

22. The method of claim 6, comprising making said pin from a shape memory alloy.

23. The method of claim 7, comprising making said pin from a shape memory alloy.

* * * * *